June 4, 1957 G. L. BACHNER 2,794,223
PROCESS OF MAKING SHELL MOLDS AND SHELL MOLDS MADE THEREBY
Filed Dec. 30, 1952 2 Sheets-Sheet 1
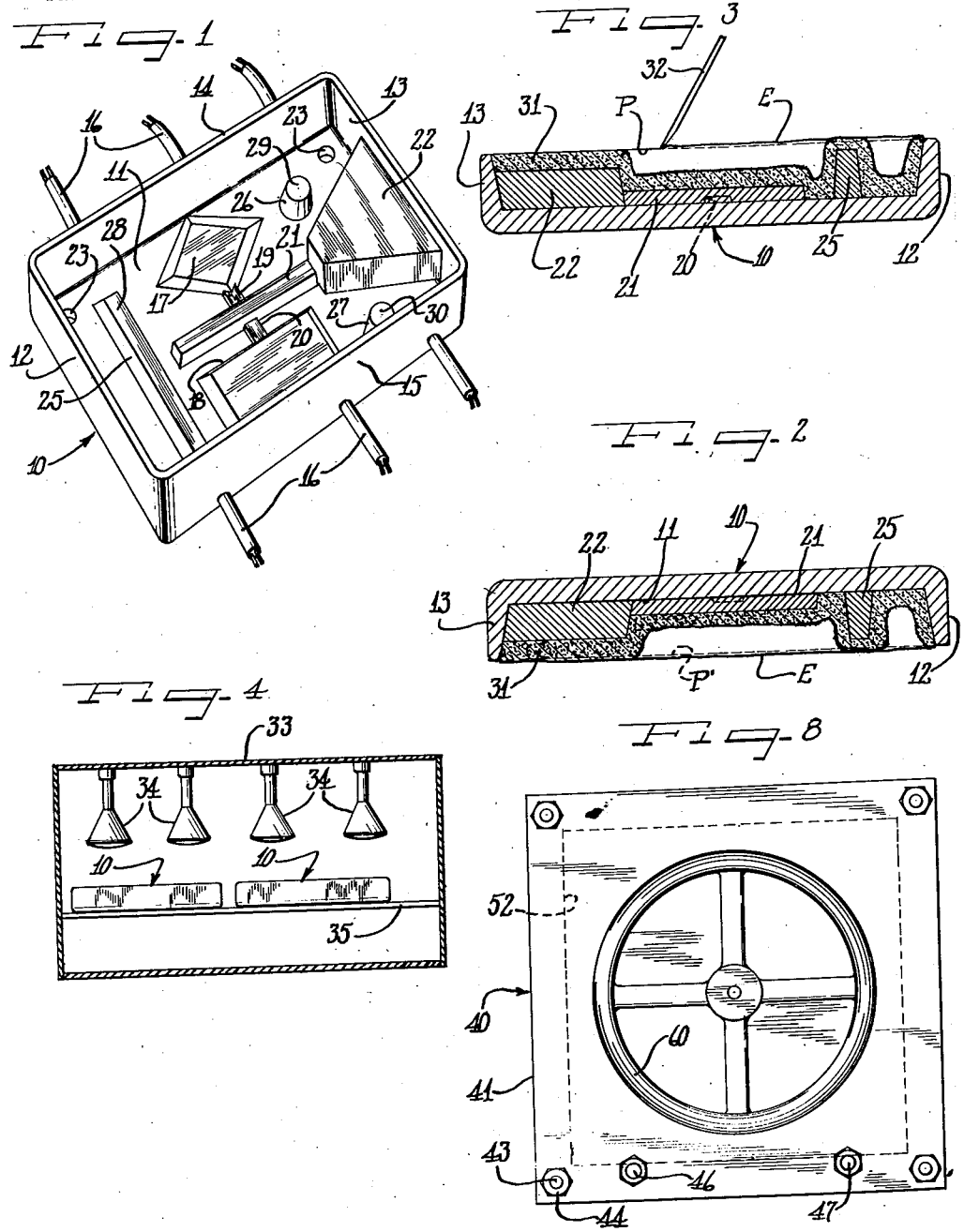
Inventor
George Louis Bachner

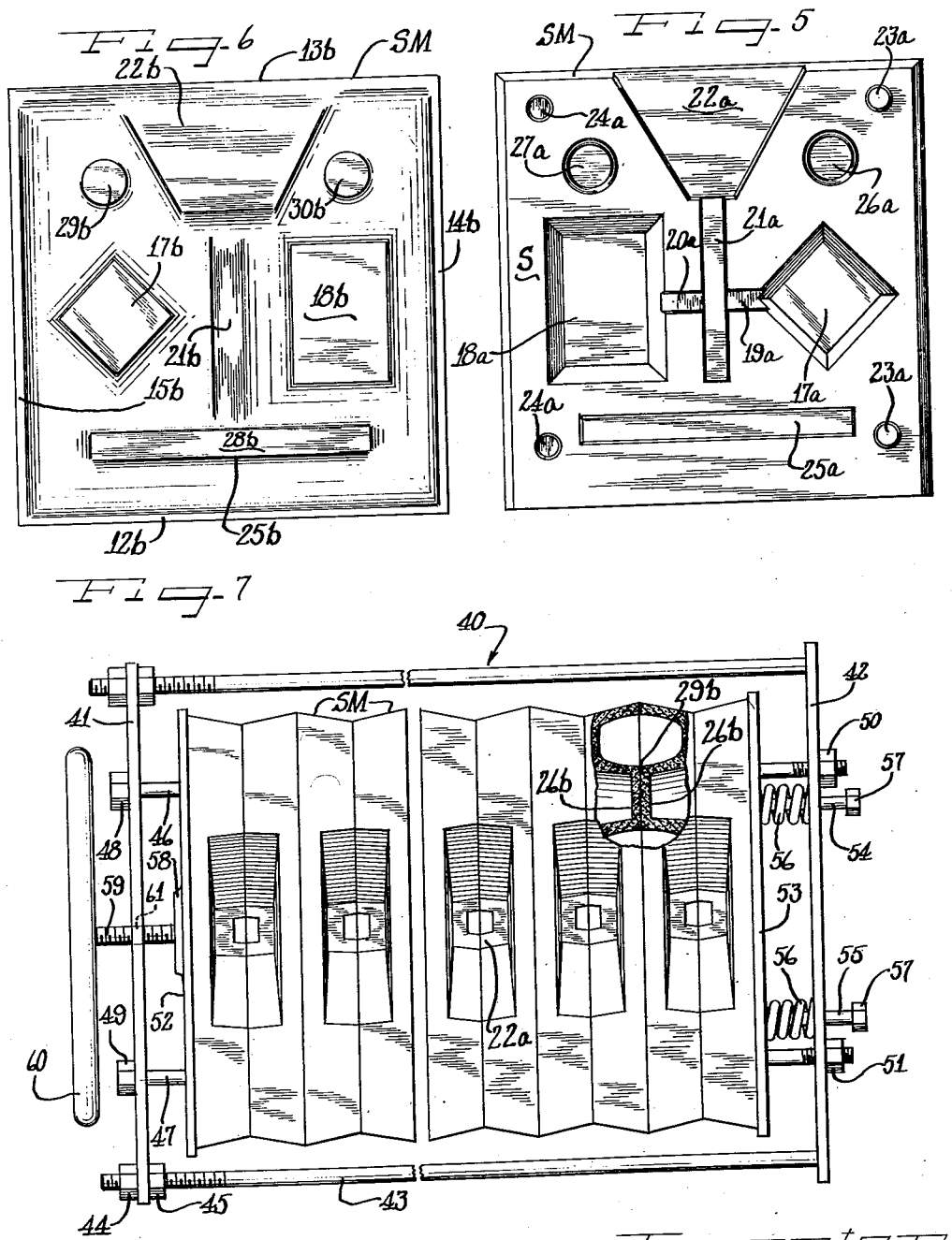

United States Patent Office 2,794,223
Patented June 4, 1957

2,794,223

PROCESS OF MAKING SHELL MOLDS AND SHELL MOLDS MADE THEREBY

George L. Bachner, Arlington Heights, Ill., assignor, by mesne assignments, to Bachner Valyi Development Corporation, Arlington Heights, Ill., a corporation of Delaware Application December 30, 1952, Serial No. 328,764

6 Claims. (Cl. 22—130)

This invention relates to a process of making shell molds of a uniform thinness and to the shell molds made thereby. More particularly, this invention relates to the making of shell molds from a mixture of a resin and an aggregate, such as silica, sand, or the like, for use in the casting of metals and alloys.

It has heretofore been proposed in the making of shell molds to cover a heated die, pattern, or the like, with a mixture of a fusible resin and sand and to continue the contact between the heated die and the resin-sand mix until a relatively thin layer thereof adjacent the heated surface of the die is fused sufficiently to render such layer coherent. Thereafter, the excess of the loose sand-resin mix was removed, as by inverting the die, and the partially fused layer further heated in an oven to cure the resin. Pairs of shell molds so prepared were then clipped together at their peripheries and backed by shot, or other loose pulverulent material, to reinforce the backs of the shell molds and prevent them from buckling during the pouring of the molten metal into the mold and prior to its solidification. In this way, metal castings have been prepared that require a minimum of grinding, machining or other finishing steps. However, this previous method has been relatively laborious and expensive due to the amount of labor required and also to the necessity of employing steel shot, or the like, for the backing of the shell molds during the pouring operation. The method has had the further disadvantage that the steel shot was likely to become mixed with the sand-resin preparation. In addition, the steel shot represented a storage and handling problem.

The method of my present invention represents an improvement over the method just described in that it eliminates the necessity of the use of steel shot, or other backing material of a loose pulverulent character. This elimination of the use of steel shot is made possible through a novel improvement in the method of making resin-sand shell molds. Although my method produces a shell mold of the same, or substantially the same comparatively uniform thinness as shell molds produced by heretofore known processes, it, in addition, provides what are termed "pressure points," whereby pairs of mating shell molds may be placed back-to-back in clamped-together relationship to receive the poured metal.

Such pressure points are provided by so arranging and constructing the die used in forming the shell molds that there are formed in the resulting shell mold a plurality of spaced surfaces on the back of the mold, which are preferably coplanar and are disposed more or less symmetrically about the mold cavities to provide points, or areas, of contact with similar pressure points on the next adjacent shell mold when pairs of such mating shell molds are arranged in clamped-together relationship. These pressure points, thus, serve to rigidify the shell molds, the back walls of which are otherwise not sufficiently rigid and strong to accommodate without rupture the amount of clamping pressure necessary to hold a plurality of such molds together with the mating surfaces of the mold halves in contact with each other during the pouring operation. In the method heretofore used the steel shot provides such backing as is required to support the back walls of the molds and keep the mating surfaces of the shell mold halves together. By the use of the pressure points just described, however, the pressure applied during the clamping of a plurality of pairs of shell molds together is relatively uniformly distributed over the back walls to the mating faces of the individual shell molds so as to eliminate the possibility of the thin shells having to withstand a localized pressure in excess of their compressive or tensile strength.

Thus, by the use of the method of my present invention, a plurality of pairs of mated shell mold halves may be aligned back-to-back between external, over-all clamping means and the mating surfaces of the pairs of mold halves held in sufficiently non-yielding surface contact to receive the poured molten metal without any liability of the mating surfaces becoming separated or of the shell mold walls bulging or rupturing. This makes possible a single pouring of metal into a multiple number of shell molds in one pass of the ladle, or other pouring means, over the assembled, clamped-together shell molds. Obviously, this is a much more economical method than that heretofore used and one that lends itself to large scale casting operations in a commercial foundry, or the like.

It is therefore an important object of this invention to provide an improved method of making shell molds of the sand-resin type that are adapted for use in the casting of metal and the like without requiring any additional means for backing and rigidifying the molds during the pouring and subsequent solidification of the castings.

It is a further important object of this invention to provide an improved die for use in the casting of shell molds, the arrangement and construction of which result in the formation of pressure points in the shell molds that serve for the distribution of clamping loads when the shell molds are assembled and clamped together in multiple pairs of mating halves, thus eliminating entirely the necessity of employing foreign backing material, such as steel shot, or the like.

It is a further important object of this invention to provide an improved sand-resin shell mold so constructed as to eliminate the necessity of backing material, such as shot or the like, because it is provided with integral pressure points that serve to distribute the clamping load when a plurality of such molds are assembled under clamping pressure for the pouring of metal.

Other and further important objects of this invention will become apparent from the following description and appended claims.

As shown on the drawings:

Figure 1 is an isometric view of a die embodying the principles of my invention.

Figure 2 is a cross-sectional view of the die of Figure 1, at that point in the operation at which the die has been filled with a sand-resin mix and after a short heating period has been inverted to remove by gravity any excess of the loose sand-resin mix.

Figure 3 is a cross-sectional view of the die of Figure 2 after it has been turned right side up, illustrating the step of scraping off sand-resin mix to form spaced coplanar spots representing pressure points on the finished sand-resin shell mold.

Figure 4 is a sectional view of an oven illustrating the step of curing the sand-resin molds while still in the dies.

Figure 5 is a top plan view of a cured, sand-resin shell mold half.

Figure 6 is a bottom plan view of the shell mold half of Figure 5.

Figure 7 is a top plan view of a plurality of shell molds assembled in mated pairs of halves in a clamping device and ready for receiving poured metal for the forming of castings in said mold.

Figure 8 is an end elevational view of the assembly of Figure 7.

On the drawings:

The reference numeral 10 indicates generally a tray-like die for use in my method of making shell molds. Said die 10 is suitably made of metal or other rigid, abrasion resistant material capable of taking a high finish. The die is rectangular in shape with a bottom wall 11 and side walls 12, 13, 14 and 15. Said side walls may all be of the same height, as shown, but at least two opposed side walls, such as the side walls 14 and 15 should be of the same height in order to facilitate a subsequent leveling operation that will be more fully described later on. The die 10 is provided with suitable means for heating the same, here shown as a plurality of electrical heating elements 16 that enter the bottom wall 11 through the opposite side walls 14 and 15.

The bottom wall 11 is provided with one or more patterns 17 and 18, which may suitably be separately formed portions secured to the bottom wall 11 by hidden securing means. The patterns serve to form the mold cavities in which the articles are cast. The patterns 17 and 18 here shown are of simple configuration merely to facilitate the illustration and description thereof. Said patterns 17 and 18 are connected by runner-forming portions 19 and 20 to a main down-gate-forming portion 21, which, in turn, is connected to a gate-forming portion 22. Said gate-forming portion 22 abuts against the end wall 13 and is equi-spaced from the side walls 14 and 15. All of these raised portions 17, 18, 19, 20, 21 and 22 lie beneath the level of the free edges of the side walls 12, 13, 14 and 15 of the die, but the upper surfaces of said raised portions need not be in the same plane and usually will not be. The bottom wall 11 of the die is provided with openings, such as the openings 23 for the formation of dowel pins in the mold and with pins (not shown) that are symmetrically positioned with respect to the openings 23 for forming dowel sockets. There may be other pins such as knockout pins that serve to separate the shell mold, after its formation, from the die 10.

In accordance with my present invention, I provide other raised portions that are spaced from each other and are spaced from the patterns. These additional raised portions result in the formation of what are here termed "pressure points," the function of which will be described in greater detail hereinafter. Such additional raised portions are illustrated by the reference numerals 25, 26 and 27. The raised portion 25 may suitably be in the form of a bar-like portion secured in the bottom wall 11 and extending between the side walls 14 and 15 but spaced therefrom and also from the end wall 12 and from any part of the patterns 17 or 18 or those raised portions connected therewith. The other raised portions 26 and 27 may be provided by frusto-conical pins, or posts, also suitably secured in the bottom wall 11 of the die. Whatever the form or contour of the additional raised portions that may be used, if they are to function satisfactorily in the formation of pressure points in the shell mold, they should be substantially symmetrically spaced from and about the patterns that form the casting cavities in the shell mold. The pressure point-forming raised portions 25, 26 and 27 follow this principle, in that they are spaced from each other, from the walls of the die and from the patterns 17 and 18, and are, in general, symmetrically arranged about the patterns 17 and 18. In addition, the upper surfaces of the pressure point-forming raised portions should all lie in the same plane, and that is true of the surfaces 28, 29 and 30 of the bar-like raised portion 25 and of the frusto-conical posts 26 and 27, respectively.

This common plane of the surfaces 28, 29 and 30 should lie outwardly from the bottom wall 11 of the outer surfaces of the patterns 17 and 18 and of the gate-forming portion 22 and of any connecting portions between said gate-forming portion and the patterns. The common plane of the surfaces 28, 29 and 30 is disposed below the top surfaces of the opposed, equal height side walls an amount substantially the equivalent of the thickness of the shell mold formed on the die 10. This is for a reason that will also become more apparent as the description proceeds.

In using a die such as illustrated in Figure 1 in the carrying out of my method of making shell molds, the first step is to heat the die by means of the heating elements 16 to the required temperature. The temperature can, of course, be accurately controlled by the use of thermostats (not shown). A parting medium is usually applied to the surfaces of the die that function as mold-forming surfaces, that is, those surfaces of the die that come into contact with the sand-resin mix. A parting agent commonly used for this purpose is a composition containing a silicone resin, preferably in the form of a highly volatilizable solution that can be sprayed on the surface of the hot die, or pattern. The die is then brought to the proper temperature, usually of from 400 to 500° F., and the sand-resin mixture is applied thereto as uniformly as possible. This may be done automatically or manually, but preferably the sand-resin mix is allowed to drop by gravity onto the heated die. A sufficient amount of the sand-resin mix is poured or dropped onto the die to fill the same up to the level of the side walls and even slightly above.

After the sand-resin mix has stood in contact with the heated die for a short period of time, usually about 3 to 20 seconds, the die and contents are then inverted to the position shown in Figure 2. The excess of the sand-resin mix that is still loose and pulverulent falls away by gravity, but that part of the mix that has been heated sufficiently to cause incipient fusion of the resin adheres to the surface of the die as a relatively thin layer 31 of from ⅛ to ¼ inch in thickness. The adhering layer 31 is of somewhat irregular thickness, but, in general, follows the contours of the raised portions, such as the portions 22, 21 and 25, shown in Figure 2.

In the next operation, illustrated in Figure 3, the die 10 is turned right side up and the layer 31 of the sand-resin mix is leveled off to a plane indicated by the line P that may suitably be that of the free edges of the side walls of the die, or at least of two opposed such side walls, as for instance the side walls 14 and 15. The leveling operation is carried out by moving a scraper blade 32 across the top of the die, and for this purpose the blade 32 is suitably of a width greater than the width of the die so that it can be held in contact with the upper free edges of the side walls 14 and 15 as it is moved from one end of the die to the other. Any excess of the sand-resin mix above the level of the plane P is removed. This excess is indicated by the letter E (Figs. 2 and 3) outwardly of the dotted line continuation of the plane P, which plane is indicated by the reference numeral P' in Figure 2.

The purpose of this leveling off operation is to provide spaced, coplanar surfaces on the pressure points, which are indicated in Figure 6 by the reference numerals 28b, 29b and 30b, on the back surface of the shell mold SM.

After the leveling operation, the die 10 with its adherent layer 31 of partially fused sand-resin mix is placed in an oven indicated more or less diagrammatically in Figure 4 by the reference numeral 33. Said oven 33 may suitably comprise an enclosure in which are mounted a plurality of sources of infra-red light, indicated by the bulbs 34, which are mounted above and in spaced relation to a shelf 35 on which the dies 10 are supported. The oven temperature is regulated to the proper temperature, which may be from 675 to 725° F. After a short interval of time in the oven, say, from ¼ minute to 2 minutes, the sand-resin layer 31, or crust, has sufficiently hardened to permit the removal of the shell mold SM from the die. The cured shell mold is then stripped from the die by means of ejection pins (not shown).

The thus stripped shell mold SM (really a shell mold half) is shown in Figures 5 and 6. On the front, or operative side of the shell mold SM are the elements corresponding with the elements already described in connection with the die, which are designated (Fig. 5) by corresponding reference numerals with the subscript a. The casting cavities are thus represented by the gate 22a, the downgate 21a and the runners 19a and 20a leading to the molding cavities 17a and 18a. The pressure points are represented by the cavities 25a, 26a and 27a. The dowel pin forming cavities are represented by the reference numerals 23a, and projections forming dowel pin receiving holes are represented by the reference numerals 24a.

The reverse, or back side, surfaces of the pressure points are designated in Figure 6 by the same reference numerals with the subscript b. These surfaces 28b, 29b and 30b all lie in the same plane, which plane lies outwardly of the back surfaces 17b and 18b of the mold forming cavities 17a and 18a, and, in fact, outwardly of any of the other back surfaces of the mold with the exception of the back edges of the walls of the shell mold, indicated at 12b, 13b, 14b and 15b, which may be, and preferably are, in the same plane with the surfaces 28b, 29b and 30b, or slightly below the plane of said surfaces 28b, 29b and 30b.

It will be understood, of course, that each shell mold comprises a pair of identical halves, each formed in an identical die. The mold half SM of Figure 5 would thus be mated with an identical mold half, with their generally planar front surfaces S in mating contact with each other. The dowel pins 24a of one shell mold half fit into the dowel pin sockets 23a of the other shell mold half to insure proper alignment of the two halves.

As illustrated in Figure 7, a plurality of mated shell mold halves are assembled together in a clamping device, indicated generally by the reference numeral 40. Said clamping device comprises a pair of end plates 41 and 42, which may be rectangular in shape, and which are held together by tie bolts 43. Said tie bolts 43 are anchored at one end, as in the end plate 42, and threaded at the other ends for free passage through apertures provided for the purpose in the end plates 41. Nuts 44 and 45 are arranged on the threaded end of each tie bolt 43 on either side of the plate 41, so that when the nuts are threaded up against the plate 41, the latter is held rigidly assembled in relation to the other end plate 42. The tie bolts 43 are suitably arranged to connect the corresponding corners of the end plates 41 and 42.

The clamping assembly 40 is also provided with longitudinally extending rods 46 and 47 that lie inwardly of the tie bolts 43 and that are secured at their ends in the end plates 41 and 42, as by means of integral heads 48 and 49 and nuts 50 and 51. These rods 46 and 47 serve as a lower support for the assembly of shell molds SM. In addition, the clamping assembly includes movable end plates 52 and 53, the latter of which serves as a backing plate and is supported from the end plate 42 by means of fixed studs 54 and 55. The studs 54 and 55 extend freely through the end plate 42 and are secured at their inner ends in the backing plate 53. Compression springs 56 are mounted on said studs 54 and 55 between said end plate 42 and the backing plate 53. Integral heads 57 on the studs 54 and 55 limit relative separating movement between the end plate 42 and the backing plate 53.

The other movable plate 52 is provided with a central boss 58 to which is rotatably secured the inner end of a threaded rod 59, on the outer end of which is mounted a hand wheel 60. Said threaded rod 59 is in threaded connection with an opening 61 in the end plate 41, through which the rod extends, so that when the hand wheel is turned, the movable end plate 52 is caused to move relative to the backing plate 53.

In assembling the shell molds in the clamping device 40, the molds are arranged in pairs and supported at their lower edges upon the rods 46 and 47 and with the gates 22a extending inwardly from the upper wall surfaces of the mated molds. After the mated pairs of faces of the mated molds have been positioned in place on the supporting rods 46 and 47 between the retracted end plate 52 and the backing plate 53, the hand wheel 60 is turned to move the end plate 52 toward the backing plate 53 and thus hold the mated pairs of shell molds in assembled relationship with their mating surfaces in close surface contact and with their back surfaces in contact through the back surfaces 28b, 29b and 30b of the pressure points and also through contact of the corresponding back edges 12b to 15b of the walls of the shell molds.

As illustrated in Figure 7, the abutting surface contact at 29b between the pressure points 26b on the back face of one mold and those on the back face of another mold serves to distribute the clamping load. If it were not for these pressure points, symmetrically spaced as they are about the mold cavities, the relatively thin shell molds would tend to flex, bulge or even rupture under the forces exerted against them by the molten metal as it is poured into the mold cavities and while contained therein prior to solidification. In the construction of the clamping device illustrated, the compression springs 56 are of sufficient strength to assure proper clamping pressure when the hand wheel 60 is operated to clamp the pairs of mated mold halves in assembled relationship.

After the molds have been clamped together in the clamping assembly 40, the casting operation is carried out by pouring from a ladle of molten metal moved in sequence from the gate of one mold to the gate of the next until all have been poured. After the castings have solidified, the clamping pressure is released by turning the hand wheel in the opposite direction, the mated mold halves are removed from the assembly and the molds disassembled to obtain the castings. The molds may be reused, if desired, a number of times.

Compositions of suitable sand-resin mixtures are well known and need not be specifically described. In general, a mixture of sand and resin containing from 3 to 10% of a suitable resin, such as a partial phenol-formaldehyde condensation product, has been found to be satisfactory. Sometimes it is desirable to use a liquid, such as kerosene, to aid in the handling of the sand-resin mix, or a solvent for the resin may be used in distributing the resin through the mass of sand. A finer sand is used where it is desired to get a particularly clean and smooth surface on the casting, but in general a clean, white Ottawa silica sand with an AFS fineness #130 to 140 gives good results, with about 4% of resin in the mixture.

One of the important features of my invention is the step of leveling off the layer 31 at the right time. That part of the sand-resin mix that is in direct contact with the heated surface of the die 10 is naturally raised to the temperature of the heated surface rather quickly but owing to the relatively low thermal conductivity of the sand-resin mix, there is a considerable temperature gradient outwardly of such heated surface into the layer of sand resting thereon. If the die is heated to between 400 and 500° F., it may require from 3 to 20 seconds for the sand-resin mix to become somewhat plastic and coherent throughout a thickness of sand-resin layer of between ⅛ and ¼ of an inch from the heated die surface. When this point has been reached, and before the sand-resin mix outwardly of such thickness of layer has become plastic, the die is inverted into the position shown in Figure 2 to remove whatever sand-resin mix will drop away from the die by gravity. The die is then turned again right side up and the scraping operation illustrated in Figure 3 is carried out. While there may be only a slight excess of sand removed during the scraping operation, as represented by the thickness of the sand-resin mixture E out beyond the dotted or full line of the plane P, it is very important that this small excess of the sand-resin mix be removed and that the external surfaces of the spaced pressure points be level to the same common plane, which, ordinarily, will also be the common plane of the free edges of the side walls of the die 10. By virtue of these back surfaces of the pressure points being all in the same plane, and preferably in the same plane as the corresponding backing edges of the walls of the shell mold, it is then possible to clamp the mated shell molds together, as illustrated in Figure 7, and apply the necessary clamping pressure without danger of the relatively thin shell molds being ruptured or even distorted. The contacting pressure points between mating pairs of molds serve to distribute the clamping load sufficiently uniformly over the shell molds to prevent flexing, buckling or rupturing of said molds while at the same time insuring the necessary degree of pressure contact between the mating faces of the individual molds.

I claim as my invention:

1. The method of making a shell mold, which comprises applying a resin-silica mixture to a heated die having raised surfaces providing a pattern and other non-connecting raised portions at least as high as said pattern and spaced from and about said pattern, limiting the time of cotact between said heated die and said resin-silica mixture to that required to fuse said resin within a uniformly thin layer only of said resin-silica mixture outwardly of said die surfaces, inverting said die to dump therefrom loose resin-silica sand, leveling off any sand above a predetermined plane spaced slightly from said other raised portions to provide spaced coplanar portions and curing said thin layer of fused resin-sand mixture to provide a self-sustaining shell mold having pressure points corresponding to said other raised coplanar portions.

2. In the method of making shell molds of a fused resin-silica mix, the steps of providing a metal die having lateral walls at least two opposite ones of which are the same height and having within the confines of said walls a pattern, a gate-forming portion and non-connecting raised portions spaced from and about said pattern but of lesser height than said two opposite walls, covering said die with a resin-silica mix to the height of said two opposite walls, heating said die to a temperature sufficient to fuse the resin in said resin-silica mix in contact with said die and form a uniformly thin fused layer over said pattern and raised portions, removing loose resin-silica removable by gravity alone, leveling off any remaining excess of sand-resin mix down to the plane of said two opposite walls and curing said fused layer to form a shell mold having pressure points on the back surfaces of said mold provided by the parts of said fused layer covering said raised portions to the aforesaid plane, whereby when said shell molds are assembled with their back surfaces in contact with each other a clamping pressure applied to said assembled molds will be distributed by said pressure points.

3. In a method of making shell molds of a fused resin-filler mix, the steps of providing a tray-like die having side walls, a smooth inner surface and rising therefrom a pattern, gate-forming portions and other portions spaced from and about said pattern but non-connected therewith and of a height less than that of at least two opposite ones of said walls, filling said die with a resin-filler flowable mix at least to the height of said two opposite walls, heating said die to a temperature sufficient to fuse the resin in said mix throughout a thin layer thereof in contact with said die to thereby form a cohesive uniformly thin fused layer thereover adhering to said die, removing the excess of said mix not cohesively united with said layer, scraping off any sand-resin mix to make the surfaces of said non-connected raised portions coplanar with the free edges of said two opposite side walls and curing said fused layer in contact with said die to form a shell mold having a molding surface conforming to the pattern surface of said die and having a back surface, spaced portions of which lie in a plane common to the free edges of said opposite side walls.

4. A die for making shell molds, comprising a rigid heat conductive body having at least two side walls of the same height rising from a generally planar surface, and other portions rising from said surface providing a pattern, a gate-forming portion and pressure point-forming portions, the latter being spaced from said pattern and wholly disconnected from said pattern and from each other, the top surfaces of said pressure point-forming portions lying in a common plane disposed below the top surfaces of the said two opposite side walls by an amount substantially equal to the thickness of the shell mold to be formed on said die.

5. A die for making shell molds, comprising a rigid heat conductive metal body having at least two side walls of the same height rising from a generally planar surface, other portions rising from said surface providing a pattern, a gate-forming portion and pressure point-forming portions, the latter being spaced from said pattern and wholly disconnected from said pattern and from each other, the top surfaces of said pressure point-forming portions lying in a common plane disposed below the top surfaces of said two opposite side walls by an amount substantially equal to the thickness of the shell mold to be formed on said die.

6. A resin-silica shell mold assembly comprising a pair of relatively thin shells of substantially uniform thickness throughout of generally not over ⅜ inch, said shells each having a front wall and side walls extending rearwardly from said front wall with the rear edges of said side walls lying in a common plane, said front walls having generally planar front surfaces for mating with each other when said shells are in assembled relation and having rearwardly offset portions providing mold, gate, and runner cavities and a plurality of hollow pressure point-forming portions when said shells are in assembled relation, the latter portions being spaced from and out of flow connection with said cavities and with each other, the rear surfaces of said pressure point-forming portions lying substantially in said common plane of said side walls to receive and distribute a clamping load when said pair of shell molds are matingly assembled and a plurality of such matingly assembled pairs are clamped together by pressure exerted at right angles to said common planes.

References Cited in the file of this patent

UNITED STATES PATENTS

| 521,450 | Adams | June 19, 1894 |
| 1,653,232 | Smith | Dec. 20, 1927 |
| 2,368,719 | Miller | Feb. 6, 1945 |

FOREIGN PATENTS

| 680,699 | Great Britain | Oct. 8, 1952 |
| 683,239 | Great Britain | Nov. 26, 1952 |

OTHER REFERENCES

Modern Metals, October 1950, pages 22–24.
Am. Foundryman, August 1952, pages 42–46.